UNITED STATES PATENT OFFICE.

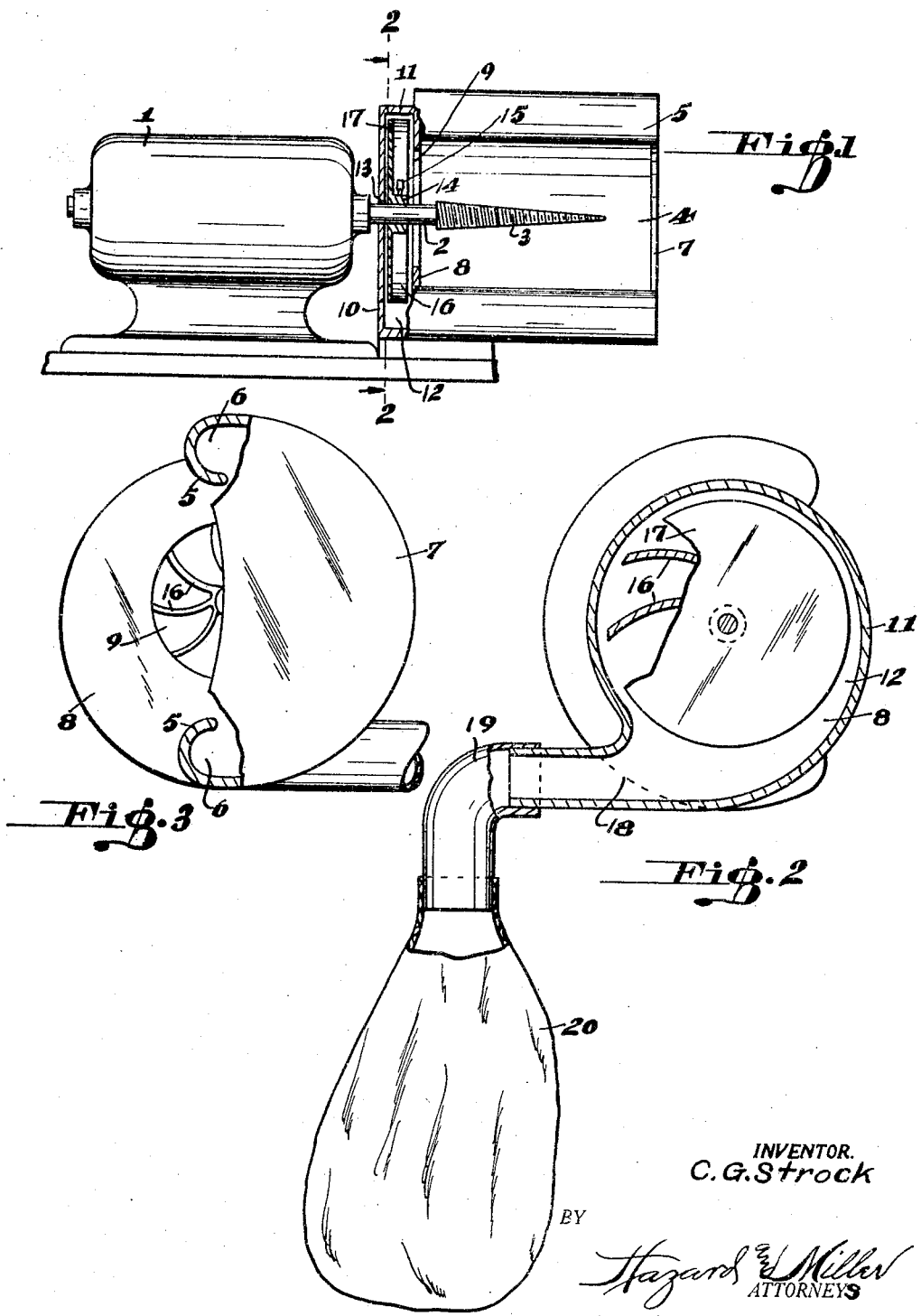

CARL G. STROCK, OF SANTA ANA, CALIFORNIA.

DUST-COLLECTOR FOR LATHES, &c.

1,386,539.  Specification of Letters Patent.  Patented Aug. 2, 1921.

Application filed May 27, 1920. Serial No. 384,699.

*To all whom it may concern:*

Be it known that I, CARL G. STROCK, a citizen of the United States, residing at Santa Ana, in the county of Orange and State of California, have invented new and useful Improvements in Dust-Collectors for Lathes, &c., of which the following is a specification.

This invention is a dust collector for lathes and the like and is particularly adapted to be used in connection with a precious metal working lathe where it is desirable to recover the metallic dust from the lathe.

The invention will be readily understood from the following description of the accompanying drawings, in which—

Figure 1 is a front elevation of a lathe having the improved dust collector attached thereto.

Fig. 2 is a transverse section on the line 2—2 of Fig. 1, and

Fig. 3 is an end view of the dust collector, partly broken away.

The improved dust collector is shown as employed upon a lathe rotated by a suitable electric motor 1 and having the shaft 2 of the motor terminating in a lathe spindle 3.

The dust collector comprises a receptacle received around the lathe spindle and a fan carried by said receptacle and mounted for rotation upon the shaft 2 so as to draw the dust from the lathe into a conduit provided in the receptacle which surrounds the lathe. This conduit is connected to a suitable bag or other device for collecting the dust.

In the particular embodiment of the invention illustrated the receptacle surrounding the lathe spindle is shown as formed of sheet metal comprising a portion 4 curved around the lathe spindle in spaced relation therefrom and having its ends suitably reversely curved as shown at 5 to provide pockets 6 at the edges of the receptacle. This receptacle extends around the rear portion of the lathe leaving the front of the lathe unobstructed so that the operator may have access to the work upon the lathe spindle.

One end of the receptacle thus formed is provided with an end plate 7 and the opposite end of the receptacle is provided with an end plate 8 formed as a disk and having a central opening 9 therethrough. A second disk 10 is spaced beyond the disk 8 by the annular wall 11 so as to form a fan chamber 12. The disk 10 is also provided with a central opening 13 through which the motor shaft extends. A fan is mounted upon the motor shaft in the fan chamber 12, this fan being shown as comprising a hub 14 fixed upon the motor shaft as by a set screw 15, and radially disposed blades 16 preferably mounted upon a disk 17 fixed to the hub 14.

The fan chamber 12 surrounding the fan as thus constructed is provided with an outlet 18 which communicates with a suitable conduit 19 having a bag or similar receptacle 20 secured over its end.

By the arrangement as thus described it will be seen that when the lathe spindle is rotated the fan will also be rotated by the motor shaft, thereby causing a suction in the space surrounding the lathe spindle as formed by the receptacle 4. This suction will draw the particles of dust from the work upon the lathe into the fan chamber and will force this dust from the fan chamber through the conduit 19 into the bag 20. The dust thus collected may be treated in any suitable manner for recovering the precious metal which may be present therein.

Various changes may be made in the construction as thus described without departing from the spirit of the invention.

What is claimed is:

A dust collector for a rotatable member including a shell curved partially around said rotatable member with the axially extending edges of said shell in circumferentially spaced relation and reversely curved upon themselves to form pockets, a discharge conduit leading from said shell and suction means coöperating therewith.

In testimony whereof I have signed my name to this specification.

CARL G. STROCK.